United States Patent
Seon et al.

(10) Patent No.: US 9,689,294 B2
(45) Date of Patent: Jun. 27, 2017

(54) ROTARY-TYPE EXHAUST HEAT RECOVERY APPARATUS

(71) Applicant: Hyundai Motor Company, Seoul (KR)

(72) Inventors: Jong-Ho Seon, Inchun-shi (KR); Ho-Chan An, Hwasung-shi (KR)

(73) Assignee: Hyundai Motor Company, Seoul (KR)

( * ) Notice: Subject to any disclaimer, the term of this patent is extended or adjusted under 35 U.S.C. 154(b) by 415 days.

(21) Appl. No.: 14/532,836

(22) Filed: Nov. 4, 2014

(65) Prior Publication Data
US 2015/0122458 A1     May 7, 2015

(30) Foreign Application Priority Data
Nov. 5, 2013    (KR) .......................... 10-2013-133262

(51) Int. Cl.
| | | |
|---|---|---|
| G05D 23/00 | (2006.01) | |
| F01N 5/02 | (2006.01) | |
| F28D 1/02 | (2006.01) | |
| F01N 3/04 | (2006.01) | |
| F28D 21/00 | (2006.01) | |
| F28F 5/00 | (2006.01) | |

(Continued)

(52) U.S. Cl.
CPC ............... *F01N 5/02* (2013.01); *F01N 3/043* (2013.01); *F28D 1/02* (2013.01); *F28D 7/0041* (2013.01); *F28D 9/0012* (2013.01); *F28D 21/0003* (2013.01); *F28F 5/00* (2013.01); *F01N 2240/02* (2013.01); *F01N 2240/36* (2013.01); *F01N 2410/02* (2013.01); *F01P 2060/16* (2013.01); *F02N 19/10* (2013.01); *F28F 2250/06* (2013.01); *Y02T 10/16* (2013.01); *Y02T 10/20* (2013.01)

(58) Field of Classification Search
CPC .......... F28D 11/02; F28D 11/00; F28D 11/06; F28D 11/08; F28D 21/0001
USPC ... 165/6, 86, 88, 89, 164, 165, 103, 96, 102
See application file for complete search history.

(56) References Cited

U.S. PATENT DOCUMENTS

| | | |
|---|---|---|
| 6,328,094 B1 | 12/2001 | Mori et al. |
| 6,330,910 B1 | 12/2001 | Bennett |

(Continued)

FOREIGN PATENT DOCUMENTS

| | | | | |
|---|---|---|---|---|
| DE | WO 2011018128 A1 * | 2/2011 | ......... | F28D 1/05333 |
| WO | WO 01/14773 A1 | 3/2001 | | |

*Primary Examiner* — Etsub Berhanu
*Assistant Examiner* — Amanda P Setiawan
(74) *Attorney, Agent, or Firm* — Morgan Lewis & Bockius LLP

(57) ABSTRACT

A rotary exhaust heat recovery apparatus may include an exhaust gas pipe including a bypass path into which a high-temperature exhaust gas is introduced and bypassed and an extension part extending from a side of the bypass path in a semi-cylindrical shape to allow the exhaust gas to pass and a semi-cylindrical heat exchanger rotatably accommodated within the exhaust gas pipe, allowing heat exchange to be performed between the high-temperature exhaust gas supplied from the bypass path and a low-temperature coolant introduced through a coolant inlet, in which a side surface of the heat exchanger includes a diameter surface formed as a flat surface and an arc surface formed as a curved surface, and the diameter surface of the heat exchanger has a surface with a rotation axis of the heat exchanger as a reference thereof which is closed and another surface provided with exhaust gas inlets.

8 Claims, 7 Drawing Sheets

(51) Int. Cl.
*F28D 7/00* (2006.01)
*F28D 9/00* (2006.01)
*F02N 19/10* (2010.01)

(56) References Cited

U.S. PATENT DOCUMENTS 8,365,813 B2 2/2013 Mercz et al.
2013/0213606 A1* 8/2013 Greber ................ F01N 5/02
165/96

* cited by examiner

→ EXHAUST-GAS FLOWING PATH
---→ COOLANT FLOWING PATH

→ EXHAUST-GAS FLOWING PATH
---→ COOLANT FLOWING PATH

ROTARY-TYPE EXHAUST HEAT RECOVERY APPARATUS

CROSS-REFERENCE TO RELATED APPLICATIONS

The present application claims priority to Korean Patent Application No. 10-2013-133262, filed Nov. 5, 2013, the entire contents of which is incorporated herein for all purposes by this reference.

BACKGROUND OF THE INVENTION

Field of the Invention

The present invention relates to an exhaust heat recovery apparatus that recovers exhaust heat discarded after engine combustion of a vehicle and uses the collected exhaust heat, and more particularly, to a rotary-type exhaust heat recovery apparatus capable of simultaneously serving as a bypass valve and a heat exchanger by rotatably providing a semi-cylindrical heat exchanger in which one surface with a rotation axis as its reference is closed and the other surface is opened within an exhaust gas pipe.

Description of Related Art

In general, a vehicle performs a warm-up step and a heating step in an early stage of starting, a thermoelectric generating step during the running of the vehicle, and a bypass step when the vehicle runs on an inclined road or runs at an excessive speed, depending on a running state of the vehicle.

An exhaust heat recovery apparatus of the vehicle is an apparatus that recovers exhaust heat discarded after engine combustion to use the recovered exhaust heat for a warm-up of the engine and a warm-up of a transmission, or transmits recovered heat energy to an air conditioning device to use the transmitted heat energy to heat the inside of the vehicle.

When the exhaust heat recovery apparatus of the vehicle is used, a coolant can be heated using a high-temperature exhaust gas in an early stage of starting. Thus, a pre-heating time of the engine is reduced, so that it is possible to improve fuel efficiency and to reduce the exhaust gas.

The largest amount of contaminants is discharged from the vehicle at the time of idling before the engine is warmed up, and it is possible to reduce contaminants discharged from the vehicle by using the exhaust heat recovery apparatus to reduce the warm-up time.

It is also possible to reduce friction within the engine and friction within the transmission by rapidly increasing temperatures of an engine coolant and transmission oil by using the coolant heated through the exhaust heat recovery apparatus. Furthermore, it is possible to rapidly heat the inside of the vehicle in the winter time.

As illustrated in FIGS. 1A and 1B, an exhaust heat recovery apparatus of a vehicle according to the related art has a structure in which a bypass valve 5 that can be rotated by a valve actuator 6 is provided at a bypass path 4 and a heat exchanger 3 including a coolant path 1 and an exhaust gas path 2 is attached to a side of the bypass path 4.

As illustrated in FIG. 1B, when the bypass path 4 is closed by the bypass valve 5, an exhaust gas is induced toward the heat exchanger 3, and a temperature of an operating fluid is increased due to heat exchange between a high-temperature exhaust gas flowing in the exhaust gas path 2 of the heat exchanger and a low-temperature coolant flowing in the coolant path 1, so that an engine and a transmission are warmed up.

However, in the exhaust heat recovery apparatus according to the related art, since the number of components such as the heat exchanger, the bypass path, the bypass valve and the valve actuator is excessively large, a structure thereof may be complicated, and manufacturing cost and weight thereof may be excessively increased.

In the exhaust heat recovery apparatus according to the related art, when the bypass path is opened, that is, the bypass is performed, since it is difficult to prevent the exhaust gas from being introduced into the heat exchanger, heat-insulating performance of the coolant may be degraded. Furthermore, when the exhaust gas is bypassed, if a separate valve operating link structure is added to prevent the exhaust gas from being introduced into the heat exchanger, an assembly process may be complicated, and manufacturing cost may be increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rotary-type exhaust heat recovery apparatus capable of reducing manufacturing cost and weight and simplifying a manufacturing process by removing a bypass valve and providing a heat exchange function and a bypass path opening/closing function to the heat exchanger and of improving heat-insulating performance of a coolant by preventing an exhaust gas from being introduced into a heat exchanger when the exhaust gas is bypassed without an additional component.

In an aspect of the present invention, a rotary-type exhaust heat recovery apparatus, may include an exhaust gas pipe having a bypass path into which a high-temperature exhaust gas is introduced, and an extension part extending from a side of the bypass path in a semi-cylindrical shape to allow the exhaust gas to pass, and a semi-cylindrical heat exchanger rotatably accommodated within the exhaust gas pipe, allowing heat exchange to be performed between the high-temperature exhaust gas supplied from the bypass path and a low-temperature coolant introduced through a coolant inlet, wherein a side surface of the heat exchanger may include a diameter surface formed as a flat surface and an arc surface formed as a curved surface, and wherein the diameter surface of the heat exchanger may have a surface with a rotation axis of the heat exchanger as a reference thereof which is closed and another surface provided with exhaust gas inlets through which the exhaust gas is introduced to flow through exhaust gas paths.

The coolant inlet is connected to an upper end of the heat exchanger to introduce the coolant into coolant paths formed within the heat exchanger, wherein a coolant discharge port, through which the coolant flowing in the coolant paths is discharged, is connected to a lower end of the heat exchanger, and wherein the coolant inlet and the coolant discharge port are coaxially disposed with the rotation axis of the heat exchanger.

Hoses made of a flexible material so as to accommodate movements of the coolant inlet and the coolant discharge port along with rotation of the heat exchanger are connected to ends of the coolant inlet and the coolant discharge port.

Exhaust gas outlets through which the exhaust gas flowing through the exhaust gas paths is discharged are formed in one side of the arc surface of the heat exchanger, wherein when the heat exchanger is rotated to be accommodated in the extension part, the arc surface of the heat exchanger and an inner surface of the extension part completely come in contact with each other to close the exhaust gas outlets by the inner surface of the extension part.

The heat exchanger is configured with a plurality of semicircular plate-shaped coolant paths through which the coolant introduced through the coolant inlet flows and a plurality of semicircular pate-shaped exhaust gas paths through which the exhaust gas flows that are alternately laminated to be adjacent to each other in parallel. The plurality of semicircular plate-shaped coolant paths are fluid-connected each other.

The heat exchanger is configured with a plurality of semicircular plate-shaped coolant paths that are spaced apart from each other in parallel, allowing the coolant introduced through the coolant inlet to flow and a plurality of pipe-shaped exhaust gas paths through which the exhaust gas flows disposed between the coolant paths that are spaced apart from each other. The plurality of semicircular plate-shaped coolant paths are fluid-connected each other.

According to various embodiments of the present invention, since the semi-cylindrical heat exchanger including the diameter surface and the arc surface is rotatably provided within the exhaust gas pipe and the diameter surface having a surface with the rotation axis of the heat exchanger as its reference which is closed and another surface penetrating to allow the exhaust gas to flow, the heat exchanger can may have a heat exchange function when the heat exchanger is disposed across the exhaust gas pipe, and the heat exchanger can may have a bypass function by opening the bypass paths when the heat exchanger is accommodated in the extension part of the exhaust gas pipe.

That is, a structure of the exhaust heat recovery apparatus can be simplified by providing a bypass valve function and a heat exchange function to the heat exchanger, so that it is easy to manufacture the exhaust heat recovery apparatus and manufacturing cost and weight thereof can be reduced.

It is also possible to minimize a region varied by rotation of the heat exchanger by disposing the coolant inlet connected to the upper end of the heat exchanger and the coolant discharge port connected to the lower end of the heat exchanger in the same line with the rotation axis of the heat exchanger.

When the heat exchanger is rotated to be accommodated, since the arc surface and the inner surface of the extension part completely come in contact with each other to completely close the exhaust gas outlets, it is possible to prevent the exhaust gas from being introduced into the heat exchanger without a separate component or a separate link structure when the exhaust gas is bypassed. As a result, it is possible to improve heat-insulating performance of the coolant.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
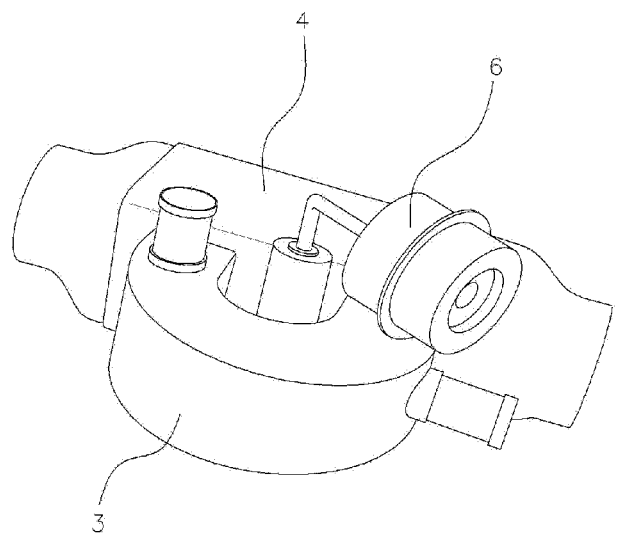
FIG. 1A is a perspective view illustrating an exhaust heat recovery apparatus according to the related art.
Figure 1B:
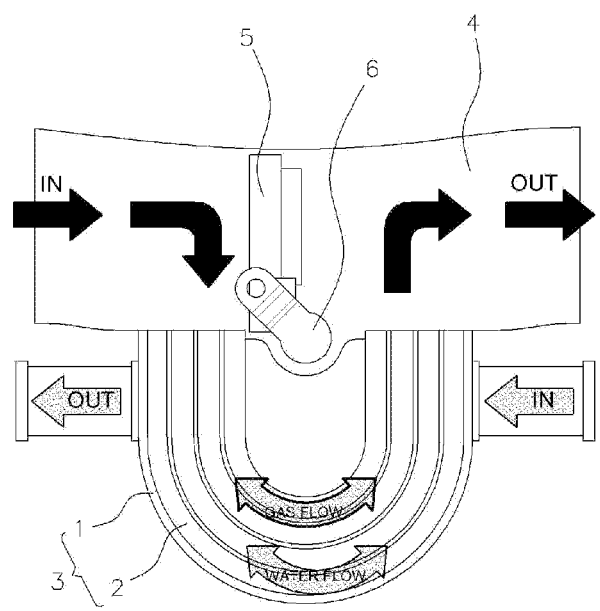
FIG. 1B is a plan cross-sectional view illustrating the exhaust heat recovery apparatus illustrated in FIG. 1A when viewed from the top.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A rotary-type exhaust heat recovery apparatus according to various embodiments of the present invention includes an exhaust gas pipe 10 that includes a bypass path 12 into which a high-temperature exhaust gas is bypassed and an extension part 14 that extends from a side of the bypass path 12 in a semi-cylindrical shape to allow an exhaust gas to pass, and a semi-cylindrical heat exchanger 20 that is rotatably accommodated within the exhaust gas pipe 10 and allows heat exchange to be performed between a high-temperature exhaust gas supplied from the bypass path 12 and a low-temperature coolant introduced through a coolant inlet 31. A side surface of the heat exchanger 20 includes a diameter surface 21 formed as a flat surface and an arc surface 22 formed as a curved surface, and the diameter surface 21 of the heat exchanger 20 whose one surface with a rotation axis 23 of the heat exchanger 20 as its reference which is closed and the other surface is provided with exhaust gas inlets 41 into which the exhaust gas is introduced to flow through exhaust gas paths 40.

Figure 2:
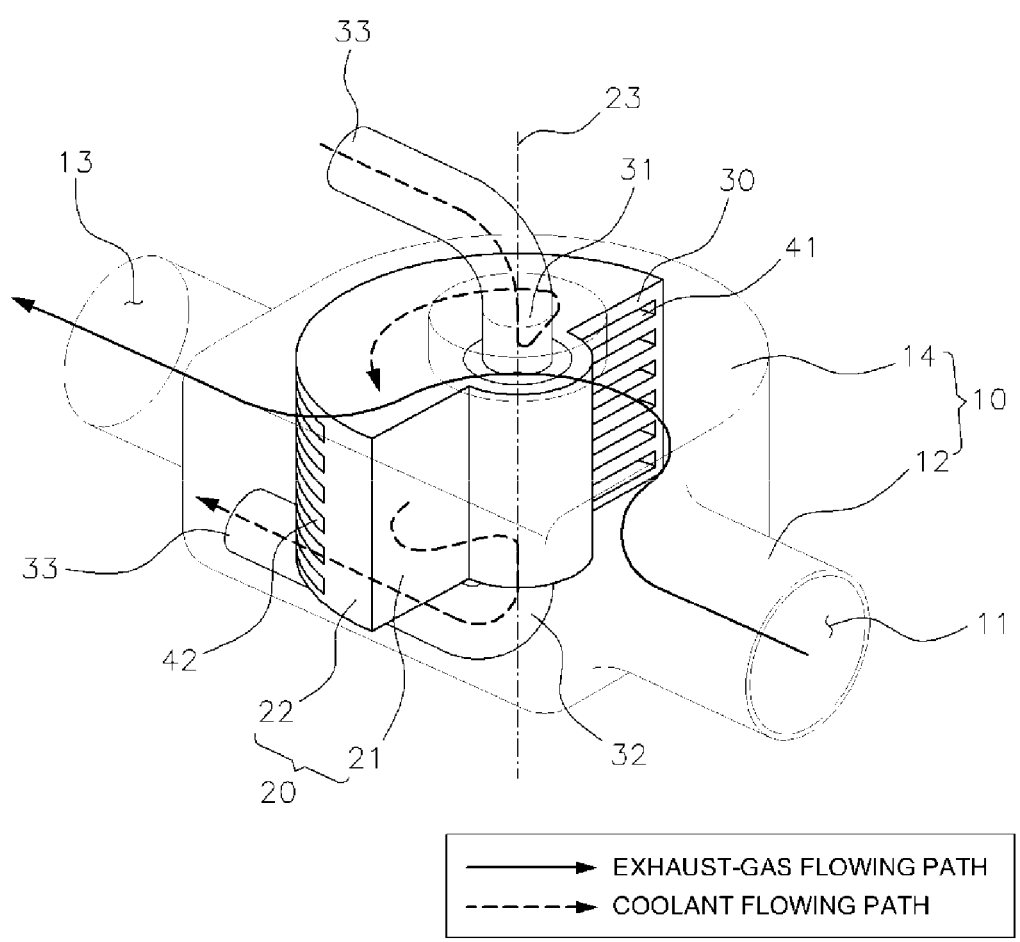
FIG. 2 is a projection perspective view illustrating a heat exchange state in an exemplary rotary-type exhaust heat recovery apparatus according to the present invention.

As illustrated in FIG. 2, the bypass path 12 includes a bypass inlet 11 into which the exhaust gas is introduced, and a bypass outlet 13 from which the exhaust gas is discharged, and has a pipe shape into which the high-temperature exhaust gas passes.

Although the bypass path 12 has the cylindrical shape in the illustrated various embodiments, the bypass path may have various shapes such as a hexagonal cylinder shape and an elliptical cylinder shape in consideration of a kind of the vehicle, the amount of discharged exhaust gas and the entire external appearance of a vehicle body.

Figure 3:
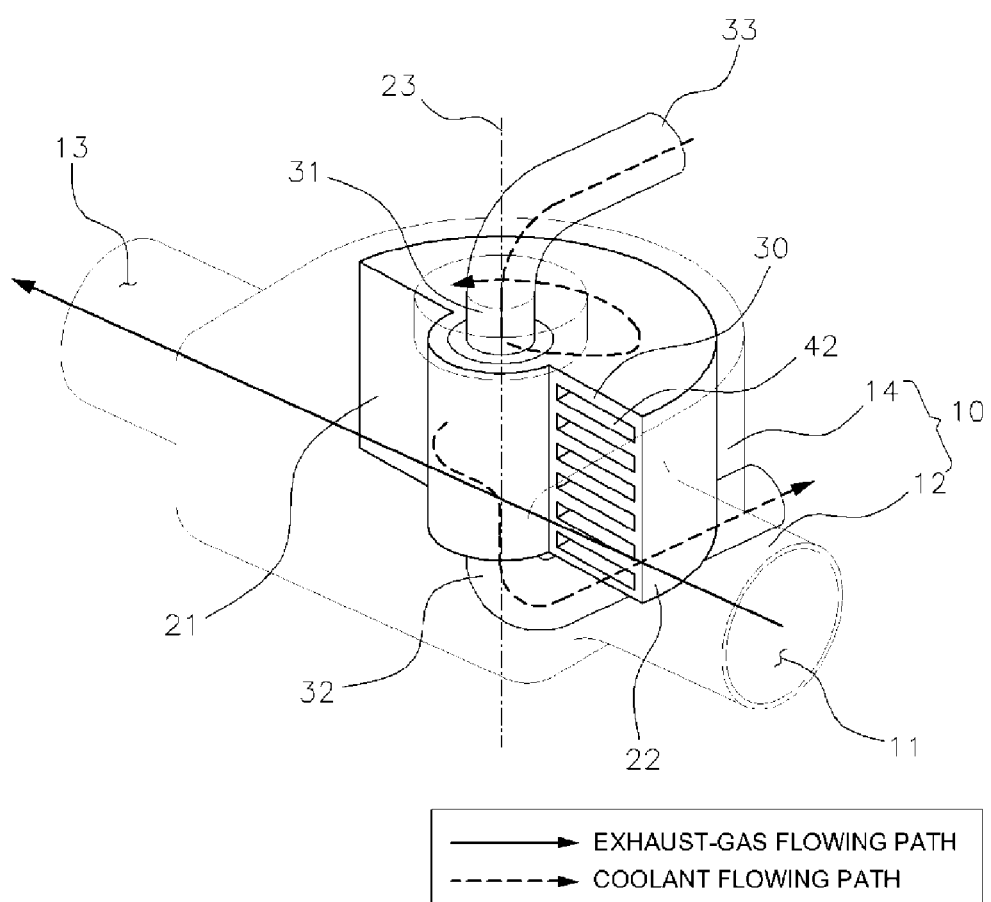
FIG. 3 is a projection perspective view illustrating a bypass state in the exemplary rotary-type exhaust heat recovery apparatus according to the present invention.

As illustrated in FIG. 3, when the exhaust gas introduced into the bypass inlet 11 is discharged to the bypass outlet 13 without passing through the heat exchanger 20 to be described below, that is, when the exhaust gas is bypassed, the extension part 14 extending in the semi-cylindrical shape so as to accommodate the heat exchanger 20 is attached to the side of the bypass path 12.

As illustrated in FIG. 2, the semi-cylindrical heat exchanger 20 is rotatably accommodated to allow heat exchange to be performed between the high-temperature exhaust gas and the low-temperature coolant within the exhaust gas pipe 10 including the bypass path 12 and the extension part 14.

As illustrated in FIG. 2, the side surface of the heat exchanger 20 is divided into the diameter surface 21 that is formed as the flat surface and includes a diameter portion of a semi-circle and the arc surface 22 that is formed as the curved surface and includes an arc portion of the semi-circle.

As illustrated in FIG. 2, the diameter surface 21 of the heat exchanger 20 whose one surface with the rotation axis 23 of the heat exchanger 20 (a left surface with the rotation axis 23 as its reference in the illustrated embodiments) is blocked and the other surface (a right surface with the rotation axis 23 as its reference in the various embodiments) is provided with the exhaust gat inlets 41 through which the exhaust gas passes.

Figure 4:
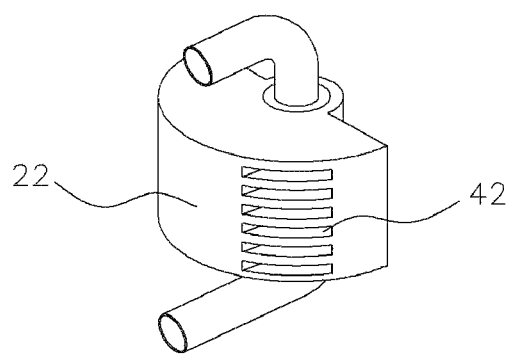
FIG. 4 is a perspective view illustrating a heat exchanger, a coolant inlet and a coolant discharge port in the exemplary rotary-type exhaust heat recovery apparatus according to the present invention.

As illustrated in FIGS. 2 and 4, the arc surface 22 whose one surface with the rotation axis 23 of the heat exchanger 20 (a surface facing the closed surface of the diameter surface 21) is provided with exhaust gas outlets 42 through which the exhaust gas is discharged and the other surface (a surface facing the surface of the diameter surface 21 in which the exhaust gas inlets 41 are formed) is closed.

That is, as illustrated in FIG. 2, the exhaust gas is introduced into the exhaust gas inlets 41, flows in the entire heat exchanger 20 through the exhaust gas paths 40 within the heat exchanger 20, and is then discharged through the exhaust gas outlets 42 disposed in a diagonal direction to the exhaust gas inlets 41.

As illustrated in FIG. 2, when heat exchange is performed between the exhaust gas and the coolant, the diameter surface 21 of the heat exchanger 20 is disposed across the exhaust gas pipe 10 while facing a direction in which the exhaust gas is introduced into the bypass path inlet 11, and the exhaust gas passes through the exhaust gas inlets 41 formed in the diameter surface 21, passes through the exhaust gas paths 40, and is then discharged to the exhaust gas outlets 42 to exchange with the coolant.

As illustrated in FIG. 3, when the exhaust gas is bypassed, the heat exchanger 20 is rotated so as to open the bypass path 12 to be accommodated in the extension part 14, and the exhaust gas is introduced into the bypass inlet 11 and is then discharged to the bypass outlet 13.

Examples of apparatus for rotating the heat exchanger 20 may include a mechanical actuator in which a straight-line motion of a wax thermostat moved up and down by expansion or contraction of wax sealed therein is converted into a rotary motion through a cam or link structure to rotate the heat exchanger, and an electronic actuator in which a temperature of the coolant is measured by a sensor and a motor is rotated by a controller to rotate the heat exchanger.

As illustrated in FIG. 2, the coolant inlet 31 for introducing the coolant into coolant paths 30 formed within the heat exchanger 20 may be connected to an upper end of the heat exchanger 20, and a coolant discharge port 32 for discharging the coolant flowing through the coolant paths 30 may be connected to a lower end of the heat exchanger 20.

The coolant inlet 31 and the coolant discharge port 32 may be naturally disposed in such a manner that the coolant inlet 31 may be connected to the lower end of the heat exchanger 20 and the coolant discharge port 32 may be connected to the upper end of the heat exchanger 20, depending on a structure of the exhaust gas recovery apparatus. Alternatively, the coolant inlet 31 may be connected to the upper end of the heat exchanger 20 and the coolant discharge port 32 may be connected to the lower end of the heat exchanger 20.

As illustrated in FIGS. 2 and 3, since the coolant inlet 31 and the coolant discharge port 32 are disposed in the same line with the rotation axis 23 of the heat exchanger 20, even though the heat exchanger 20 is rotated, the coolant inlet 31 and the coolant discharge port 32 are formed so as to be rarely moved.

That is, the coolant inlet 31 and the coolant discharge port 32 may be respectively disposed at the upper end and the lower end of the heat exchanger 20 to face each other with the rotation axis 23 of the heat exchanger 20 its reference.

Moreover, as illustrated in FIGS. 2 and 3, hoses 33 made of a flexible material so as to accommodate movements of the coolant inlet 31 and the coolant discharge port 32 along with rotation of the heat exchanger 20 may be connected to ends of the coolant inlet 31 and the coolant discharge port 32.

The hoses 33 are formed as a pipe made of a flexible material such as rubber, vinyl or cloth that can be easily bent, and allow the coolant to be supplied to the coolant paths 30 regardless of the movements of the coolant inlet 31 and the coolant discharge port 32.

As illustrated in FIG. 3, when the heat exchanger 20 is rotated to be accommodated within the extension part 14, the arc surface 22 and an inner surface of the extension part 14 may completely come in contact with each other to close the exhaust gas outlets 42 formed in the one side of the arc surface 22 by the inner surface of the extension part 14.

That is, for the sake of convenience in description, although it has been illustrated in the illustrated embodiments that there is a slight gap between the extension part 14 and the arc surface 22 of the heat exchanger 20, the arc surface 22 of the heat exchanger 20 and the inner surface of the extension part 14 may have almost the same radius, the same arc and the same height.

Figure 5A:
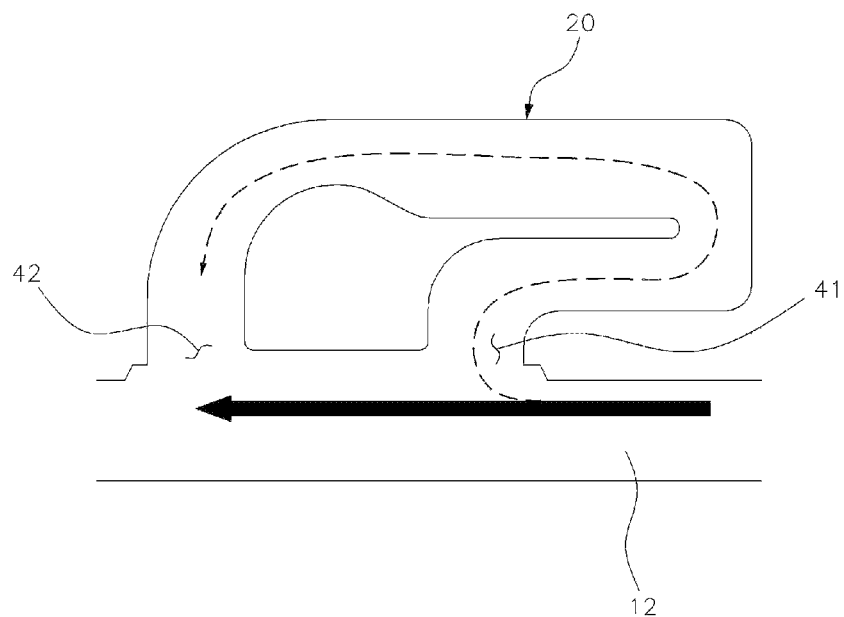
FIG. 5A is an exemplary cross-sectional view illustrating flow of an exhaust gas when exhaust gas outlets are opened in the exemplary rotary-type exhaust heat recovery apparatus according to the present invention.
Figure 5B:
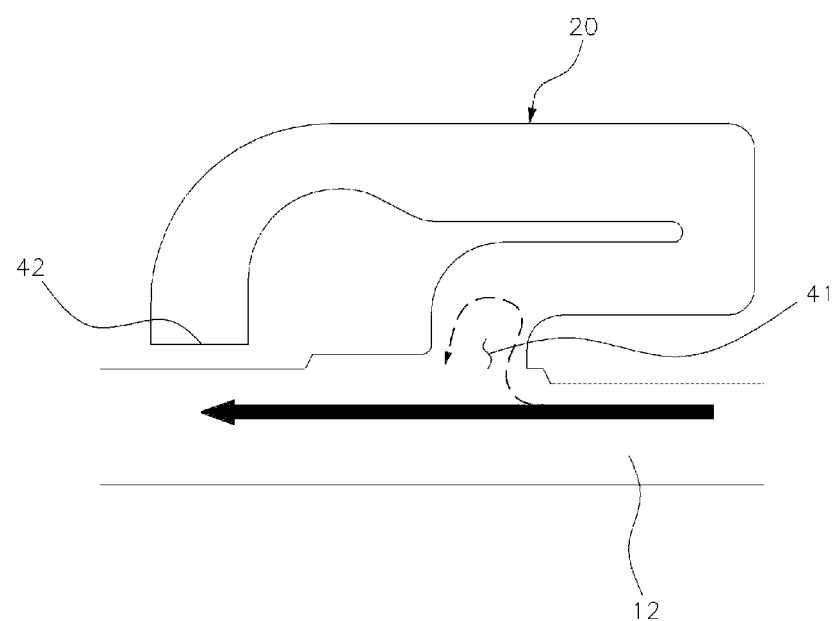
FIG. 5B is an exemplary cross-sectional view illustrating the flow of the exhaust gas when the exhaust gas outlets are closed in the exemplary rotary-type exhaust heat recovery apparatus according to the present invention.

FIGS. 5A and 5B are exemplary diagrams that schematically illustrate the heat exchanger 20 and the bypass path 12 in order to check the amount of the exhaust gas, which is introduced into the heat exchanger 20, of the bypassed exhaust gas when the exhaust gas outlets 42 are opened and when the exhaust gas outlets 42 are closed.

As illustrated in FIG. 5A, when the exhaust gas outlets 42 are opened, even though the exhaust gas is bypassed, since the exhaust gas is introduced into the heat exchanger 20 as small as about 5% of a flow rate thereof, heat-insulating performance of the coolant is degraded. Meanwhile, as illustrated in FIG. 5B, when the exhaust gas outlets 42 are closed, even though the exhaust gas is bypassed, the exhaust gas is rarely introduced into the heat exchanger 20.

Accordingly, as in various embodiments of the present invention, when the arc surface 22 and the inner surface of the extension part 14 completely come in contact with each other to close the exhaust gas outlets 42, it is possible to improve the heat-insulating performance of the coolant when the exhaust gas is bypassed.

Figure 6:
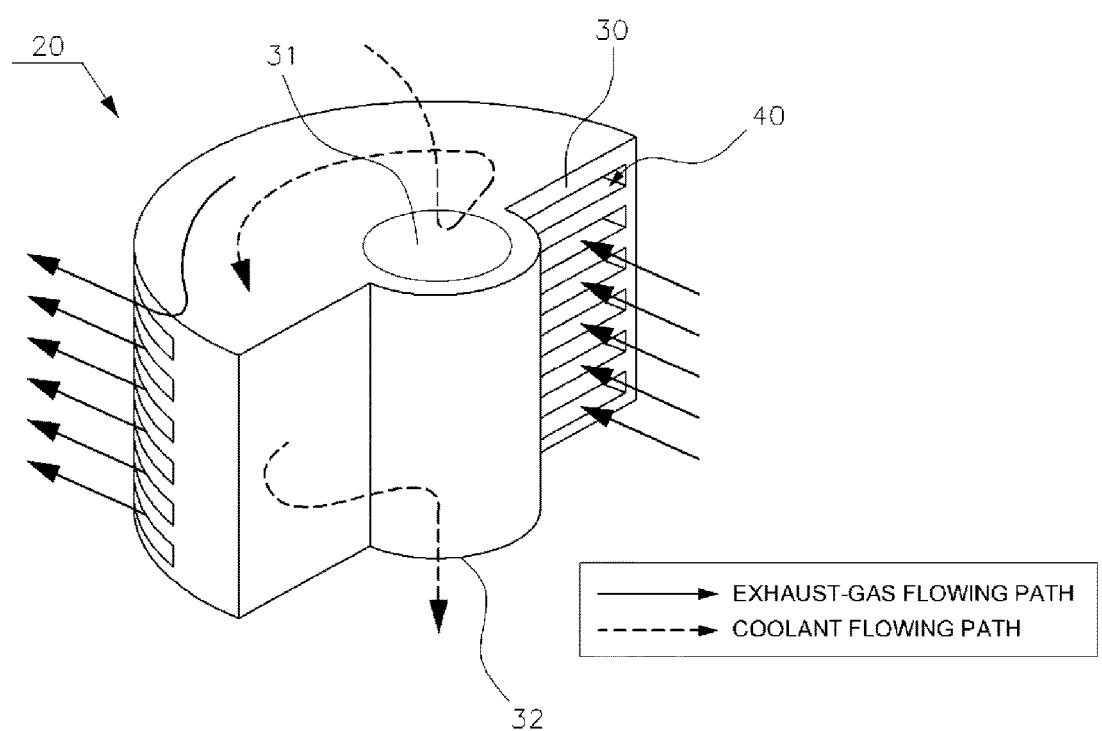
FIG. 6 is a perspective view illustrating the heat exchanger in an exemplary rotary-type exhaust heat recovery apparatus according to the present invention.

As illustrated in FIG. 6, the heat exchanger 20 may be a laminated heat exchanger in which a plurality of semicircular plate-shaped coolant paths 30 through which the coolant introduced through the coolant inlet 31 flows and a plurality of semicircular plate-shaped exhaust gas paths 40 through which the exhaust gas flows are alternately laminated so as to be adjacent to each other in parallel.

As stated above, since the coolant paths 30 and the exhaust gas paths 40 are alternately disposed to be adjacent to each other, it is possible to maximize heat exchange performance through the heat exchanger 20.

Figure 7:
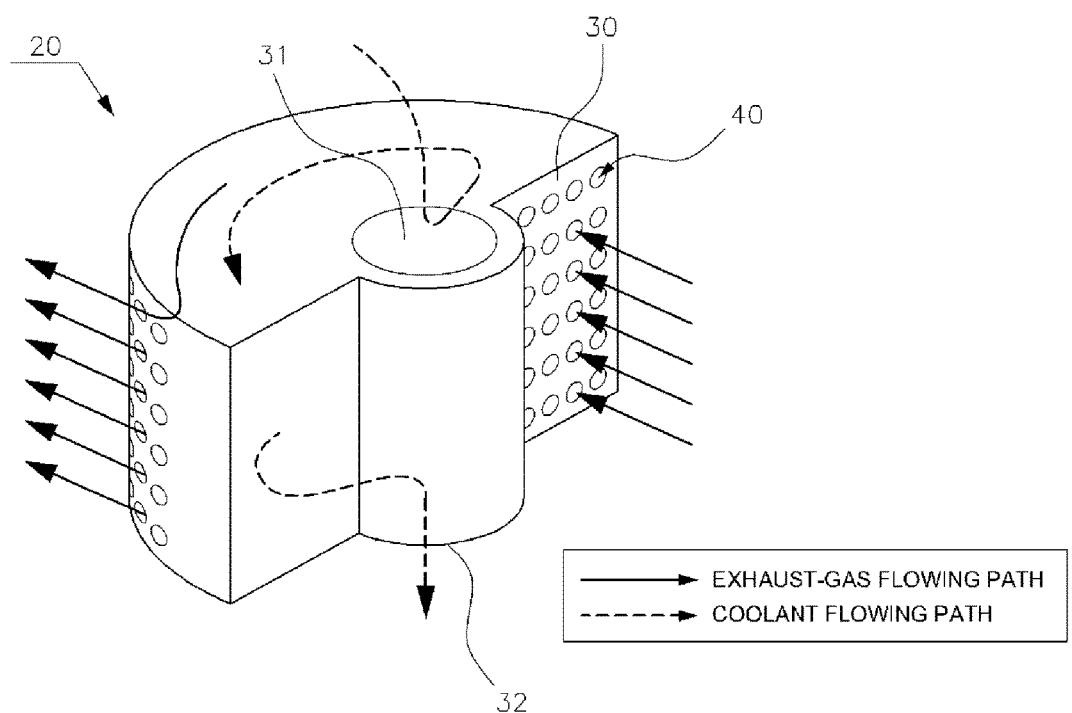
FIG. 7 is a perspective view illustrating the heat exchanger in an exemplary rotary-type exhaust heat recovery apparatus according to the present invention.

As illustrated in FIG. 7, the heat exchanger 20 may be a capillary-type heat exchanger in which a plurality of semicircular plate-shaped coolant paths 30 through which the coolant introduced through the coolant inlet 31 flows is disposed to be spaced apart from each other in parallel and a plurality of pipe-shaped exhaust gas paths 40 through which the exhaust gas flows is disposed between the coolant paths 30 to be spaced apart from each other.

Since the semicircular plate-shaped coolant paths 30 are disposed to be spaced apart from each other as in the laminated heat exchanger illustrated in FIG. 6, and the plurality of small pipe-shaped exhaust gas paths 40 is disposed between the coolant paths 30 as illustrated in FIG. 7, it is possible to maximize heat exchange performance.

An operation process of the rotary-type exhaust heat recovery apparatus according to the various embodiments of the present invention is as follows.

As illustrated in FIG. 2, the exhaust gas discharged from an engine in an early stage of starting of the vehicle is introduced into the exhaust gas pipe 10 through the bypass inlet 11, and the coolant is introduced into the coolant paths 30 through the coolant inlet 31 connected to the engine.

At this time, the diameter surface 21 of the heat exchanger 20 is disposed across the exhaust gas pipe 10 in a direction facing the inlet direction of the exhaust gas. The exhaust gas flows within the heat exchanger 20 through the exhaust gas inlets 41 of the heat exchanger 20, and is then discharged through the exhaust gas outlets 42.

Accordingly, the heat exchange between the high-temperature exhaust gas and the low-temperature coolant is performed within the heat exchanger 20, and the heated coolant serves to warm up the engine and the transmission.

As illustrated in FIG. 3, after the vehicle is warmed up, the heat exchanger 20 is rotated to be accommodated in the extension part 14 of the exhaust gas pipe 10, and as the heat exchanger 20 is removed from the bypass path 12 to open the bypass path 12.

Accordingly, the high-temperature exhaust gas introduced into the bypass path 12 through the bypass inlet 11 is mostly discharged through the bypass outlet 13 without passing through the heat exchanger 20, so that it is possible to prevent an excess thermal load of the engine.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rotary-type exhaust heat recovery apparatus, comprising:
   an exhaust gas pipe including:
       a bypass path into which a high-temperature exhaust gas is introduced; and
       an extension part extending from a side of the bypass path in a semi-cylindrical shape to allow the exhaust gas to pass; and
   a semi-cylindrical heat exchanger rotatably accommodated within the exhaust gas pipe, allowing heat exchange to be performed between the high-temperature exhaust gas supplied from the bypass path and a low-temperature coolant introduced through a coolant inlet of the heat exchanger,
   wherein a side surface of the heat exchanger includes a diameter surface formed as a flat surface and an arc surface formed as a curved surface,
   wherein the diameter surface of the heat exchanger has a surface with a rotation axis of the heat exchanger as a reference thereof which is closed and another surface provided with exhaust gas inlets through which the exhaust gas is introduced to flow through exhaust gas paths; and
   wherein the heat exchanger is rotated to be accommodated in the extension part, the arc surface of the heat exchanger and an inner surface of the extension part completely come in contact with each other to close the exhaust gas outlets by the inner surface of the extenson part.

2. The apparatus of claim 1,
   wherein the coolant inlet is connected to an upper end of the heat exchanger to introduce the coolant into coolant paths formed within the heat exchanger,
   wherein a coolant discharge port, through which the coolant flowing in the coolant paths is discharged, is connected to a lower end of the heat exchanger, and
   wherein the coolant inlet and the coolant discharge port are coaxially disposed with the rotation axis of the heat exchanger.

3. The apparatus of claim 2, wherein hoses made of a flexible material so as to accommodate movements of the coolant inlet and the coolant discharge port along with rotation of the heat exchanger are connected to ends of the coolant inlet and the coolant discharge port.

4. The apparatus of claim 1,
wherein exhaust gas outlets through which the exhaust gas flowing through the exhaust gas paths is discharged are formed in one side of the arc surface of the heat exchanger.

5. The apparatus of claim 1, wherein the heat exchanger is configured with a plurality of semicircular plate-shaped coolant paths through which the coolant introduced through the coolant inlet flows, and a plurality of semicircular plate-shaped exhaust gas paths through which the exhaust gas flows, wherein the plurality of coolant paths and the plurality of the exhaust gas paths are alternately laminated to be adjacent to each other in parallel.

6. The apparatus of claim 5, wherein the plurality of semicircular plate-shaped coolant paths are fluidly-connected to each other.

7. The apparatus of claim 1, wherein the heat exchanger is configured with a plurality of semicircular plate-shaped coolant paths that are spaced apart from each other in parallel, allowing the coolant introduced through the coolant inlet to flow, and a plurality of pipe-shaped exhaust gas paths through which the exhaust gas flows, disposed between the coolant paths that are spaced apart from each other.

8. The apparatus of claim 7, wherein the plurality of semicircular plate-shaped coolant paths are fluidly-connected to each other.

* * * * *